United States Patent [19]

Aihara et al.

[11] Patent Number: 4,909,468

[45] Date of Patent: Mar. 20, 1990

[54] POWERED SEAT SLIDE DEVICE

[75] Inventors: Tsutomu Aihara, Yokohama; Yasuo Hirama, Chigasaki; Hiroaki Iwamoto, Ayase, all of Japan

[73] Assignees: Ikeda Bussan Co., Ltd., Ayase; Ohi Seisakusho Co., Ltd., Yokohama; Nissan Shatai Company, Limited, Hiratsuka, all of Japan

[21] Appl. No.: 290,877

[22] Filed: Dec. 22, 1988

Related U.S. Application Data

[63] Continuation of Ser. No. 78,706, Jul. 28, 1987, abandoned.

[30] Foreign Application Priority Data

Jul. 31, 1986 [JP] Japan ................................. 61-181033

[51] Int. Cl.$^4$ ........................................... F16M 13/00
[52] U.S. Cl. ..................................................... 248/429
[58] Field of Search ............... 248/430, 429, 419, 424; 297/330, 346

[56] References Cited

U.S. PATENT DOCUMENTS

| 2,805,701 | 9/1957 | McCormick | 155/14 |
| 3,155,363 | 11/1964 | Lohr | 248/419 |
| 3,313,512 | 4/1967 | Colautti et al. | 248/424 |
| 4,089,500 | 5/1978 | Gustafsson | 248/429 |
| 4,364,536 | 12/1982 | Klueting | 248/429 |
| 4,516,811 | 5/1985 | Akiyama et al. | 248/429 X |

FOREIGN PATENT DOCUMENTS

| 2844647 | 4/1980 | Fed. Rep. of Germany . |
| 1415381 | 9/1965 | France . |
| 2341454 | 9/1977 | France . |
| 2440285 | 5/1980 | France . |
| 2510952 | 2/1983 | France . |

Primary Examiner—Alvin C. Chin-Shue
Attorney, Agent, or Firm—Foley & Lardner, Schwartz, Jeffery, Schwaab, Mack, Blumenthal & Evans

[57] ABSTRACT

Herein disclosed is a powered seat slide device which comprises an elongate rack plate which is received in an elongate tunnel-like space defined between movable and stationary rails and secured to the stationary rail, a gear mechanism which is mounted to the movable rail and has a pinion projected into the tunnel-like space to operatively engage with the rack plate, and an electric motor for actuating the gear mechanism.

14 Claims, 3 Drawing Sheets

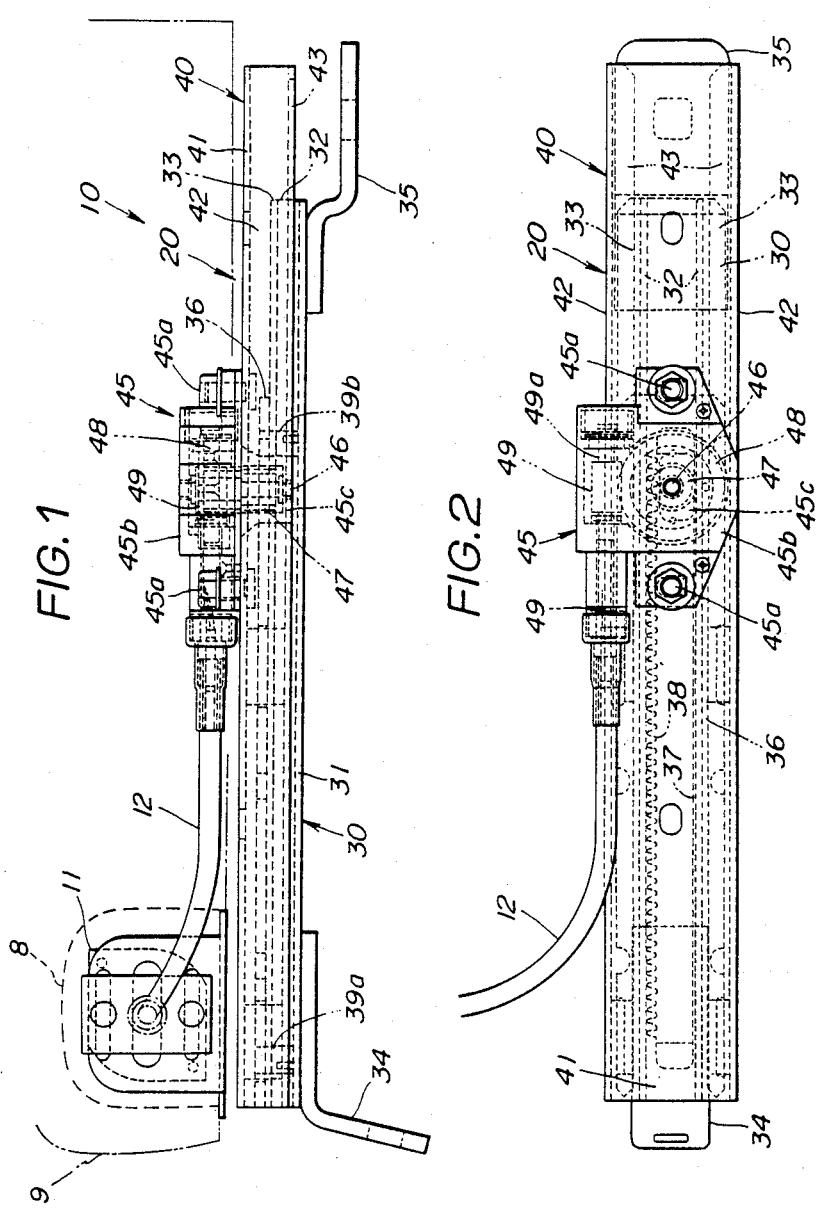

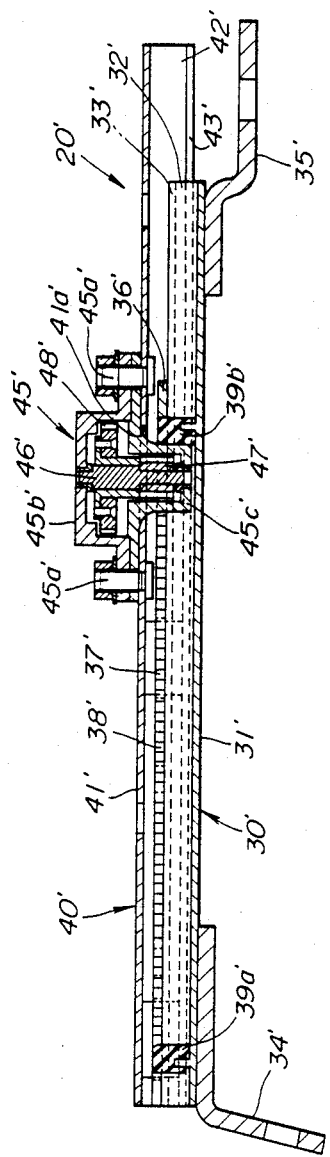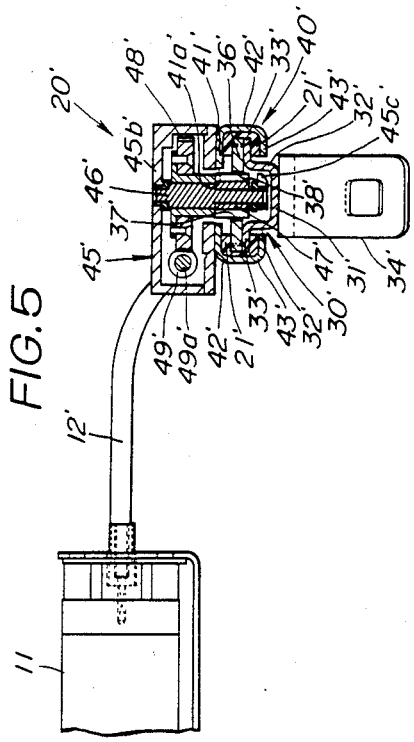

POWERED SEAT SLIDE DEVICE

This application is a continuation of Ser. No. 078,706 filed 7/28/87 now abandoned.

BACKGROUND OF THE INVENTION

1. Field of the Invention

The present invention relates in general to a seat slide device for sliding a seat to a desired position to provide a seat occupant with a comfortable sitting posture, and more particularly, the present invention is concerned with a powered seat slide device which slides the seat by the aid of a motor.

2. Description of the Prior Art

Hitherto, various types of powered seat slide devices have been proposed and put into practical use particularly in the field of motor vehicles. However, due to their inherencies, some of the conventional powered seat slide devices are compelled to have unsightly gear mechanisms naked or exposed to the view thereby deteriorating the external appearances thereof. This has narrowed the industrial field where such powered seat slide devices are practically used.

One of measures for solving such drawback is disclosed in Japanese Utility Model Second Provisional Publication No. 57-47225. In this measure, the gear mechanism is substantially entirely housed in an elongate tunnel-like space defined by the coupled stationary and movable rails. Because the unsightly parts of the gear mechanism are concealed by the coupled rail unit, external appearance of the seat slide device is improved. However, mounting the almost all parts of the gear mechanism in the tunnel-like space brings about a need for increasing the size of the coupled rail unit. As is known, bulky construction of the seat slide device causes not only increase in weight but also raise the seat to such a height as not to provide a seat occupant with a comfortable sitting posture.

SUMMARY OF THE INVENTION

It is therefore an object of the present invention to provide a powered seat slide device which is free of the above-mentioned drawbacks.

According to the present invention, there is provided a powered seat slide device for sliding a seat on a floor to a desired position, which comprises two stationary rails extending on and along the floor in parallel with each other; two movable rails slidably and respectively engaged with the stationary rails include mounting thereon the seat mounted thereon, each movable rail and the associated stationary rail being assembled to define therebetween an elongate tunnel which extends along a common axis of the stationary and movable rails; an elongate rack plate housed in the elongate tunnel and secured to one of the stationary and movable rails to extend along the same; a gear mechanism mounted to the other of the stationary and movable rails to move therewith, the gear mechanism having a pinion which is projected into the elongate tunnel and operatively engaged with the rack plate; and an electric motor for actuating the gear mechanism.

BRIEF DESCRIPTION OF THE DRAWINGS

Other objects and advantages of the present invention will become apparent from the following description when taken in conjunction with the accompanying drawings, in which:

FIG. 1 is a side view of the one of rail units employed in a powered seat slide device of the present invention;

FIG. 2 is a plan view of the rail unit shown in FIG. 1;

FIG. 4 is a sectional view taken along the line IV—IV of FIG. 3; and

FIG. 5 is a sectional view taken along the line V—V of FIG. 3.

DETAILED DESCRIPTION OF THE INVENTION

Figure 3:
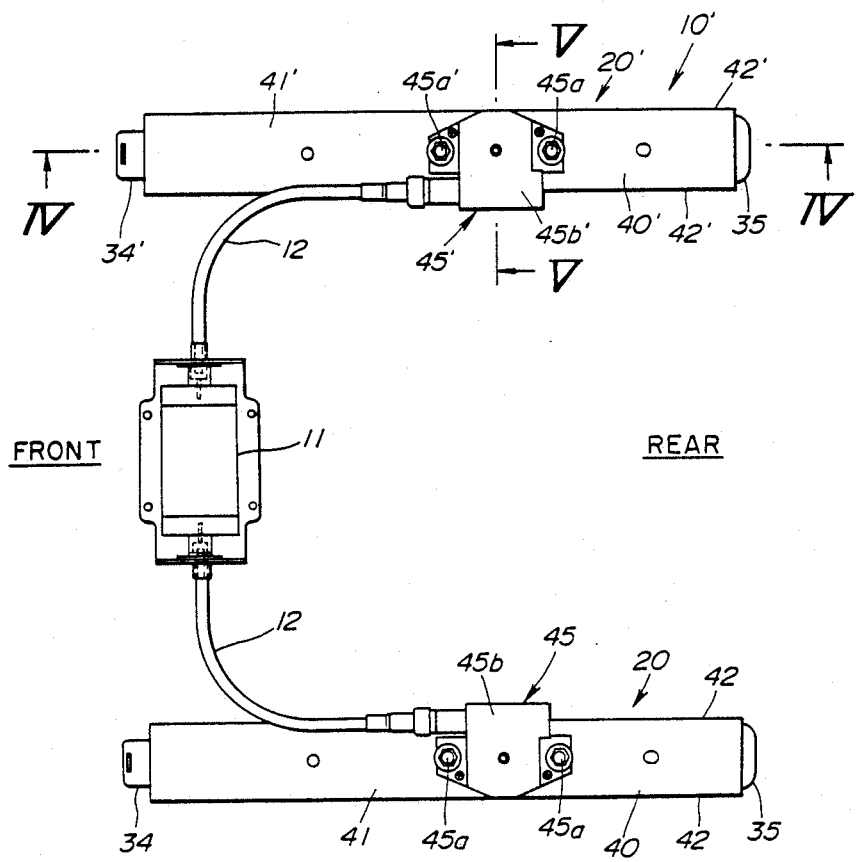
FIG. 3 is a plan view of the powered seat slide device of the present invention.

Referring to the drawings, particularly FIG. 3, there is shown a powered seat slide device 10 according to the present invention.

The powered saat slide device 10 comprises generally two, that is, left and right rails units 20 and 20' arranged in parallel on a vehicle floor (not shown) and an electric motor 11 received in a recess 8, shown phantom in FIG. 1, formed in a front lower portion of a seat proper 9, shown in dashed lines in FIG. 1. As is seen from FIG. 1, the motor 11 has two flexible drive cables 12 and 12' extending therefrom to the rail units 20 and 20'. Although not shown in the drawings, suitable cross beams are arranged on the two rail units 20 and 20' to support thereon the seat proper. It is to be noted that the rail units 20 and 20' illustrated in the drawings assume their rearmost conditions wherein the seat thereon assumes its rearmost position.

The parts of the two rail units 20 and 20' are substantially the same in construction and configuration, and thus, for ease of understanding and description, the parts of the right rail unit 20' will be indicated by the addition of "' (prime) " after each corresponding reference numeral.

As is seen from FIG. 1, the rail unit 20 comprises a stationary rail 30 mounted on the vehicle floor and a movable rail 40 secured to a bottom portion of the seat. As will become apparent as the description proceeds, the movable rail 40 is slidably engaged with the stationary rail 30, so that the seat is movable substantially horizontally over the vehicle floor.

As is understood from FIG. 5 which shows the right rail unit 20', the stationary rail 30' is of a flanged channel member which includes a bottom wall 31', parallel side walls 32' and 32' raised vertically from respective sides of the bottom wall 31' and flanges 33' and 33' extending outwardly from the tops of the respective side walls 32' and 32'. As is well seen from FIG. 4, front and rear ends of the bottom wall 31' of the stationary rail 30' are respectively secured to mounting brackets 34' and 35' which are in turn bolted at their base portions to the vehicle floor. For the purpose which will be clarified hereinafter, the bottom all 31' of the stationary rail 30' is provided at longitudinally spaced portions with stoppers 39a' and 39b' each including an elastomeric member held by a stud formed on the bottom wall 31'. An elongate plate 36' is secured at its both sides to the flanges 33' add 33' of the stationary rail 30' and extends along the same. The plate 36' is formed with a longitudinally extending slit 37' one side of which is formed with evenly spaced teeth 38' which serve as a rack.

The movable rail 40' has a generally C-shaped cross section, which comprises a major flat wall 41', parallel side walls 42' and 42' extending downwardly from respective sides of the major flat wall 41' and flanges 43' and 43' extending inwardly, that is, toward each other from the lower ends of the side walls 42' and 42'. For the purpose which will be clarified hereinafter, the major flat wall 41' the movable rail 40' is formed with an opening 41a'. As is seen from FIG. 5, upon proper coupling, the inwardly flanged side walls 42' and 42' of the movable rail 40' embrace the outside flanges 33' and 33' of the stationary rail 30' in a manner to provide a so-called "slidable interlocking" therebetween. The flanges 33' and 33' of the stationary rail 30' and the slitted elongate plate 36' are provided at their side ends with plastic sliders 21' and 21' which are snugly an slidably received in respective channels 40a' and 40a' defined by the inwardly flanged side walls 42' and 42' of the movable rail 40'. With this arrangement, a smooth sliding movement of the movable rail 40' relative to the stationary rail 30' is achieved.

As is seen from FIG. 4. the movable rail 40' mounts thereon a gear housing 45' at the portion where the opening 41a' is provided. The gear housing 45' is secured to the major flat wall 41' of the rail 40' by means of bolts 45a' and 45a' and nuts (no numerals). The gear housing 45' should be placed at such a position as not to interfere with the bottom of the seat and comprises a supporting hub member 45c' projected through the opening 41a' into the interior of the coupled rail unit 20' and a lid member 46b' mounted on the hub member 45c' and secured to the same by means of the bolts 45a' and 45a' and the nuts. as is understood from FIG. 4, the mounting of the gear housing 45' to the movable rail 40' is so made as to place the hub member 45c' between the two stoppers 39a' and 39b' on the stationary rail 30'. Thus, it will be appreciated that the forward and rearward sliding movement of the movable rail 40' on the stationary rail 30' is limited by engagement of the hub member 45c' with the front and rear stoppers 39a' and 39b'.

A vertical shaft 46' is rotatably held in the gear housing 45' having its upper and lower ends journaled by bearings (no numerals) fixed to the lid member 45b' and the hub member 45c' respectively. As will be understood from FIG. 5, the vertical shaft 46' is provided, at a portion exposed to the interior to the coupled rail unit 20' with a pinion 47' which is meshed with the teeth 38' of the slitted elonqate plate 36'. For this, the width of the slit 37' of the plate 36' is sized to receive the pinion 47'. The vertical shaft 46' is further provided at its upper portion with a worm wheel 48' which is meshed with a worm 49' (see FIG. 5) on a horizontal shaft 49a'. The horizontal shaft 49a' is rotatably held in the gear housing 45'. As will be understood from FIG. 2, one end 49b (49b') of the horizontal shaft 49a (49a') is connected to the leading end of the flexible drive cable 12 (12') from the motor 11. Thus, it will be appreciated that the worm 49', the worm wheel 48', the vertical shaft 46' and the pinion 47' constitute a so-called gear train.

In the following, operation of the powered seat slide device 10 of the invention will be described. For facilitation, the description will be made only with respect to the right rail unit 20' because the other, viz., left rail unit 20 operates in substantially the manner, and the description will be commenced with respect to the condition illustrated in the drawings wherein the seat (not sown), viz., the movable rail 40' fixed thereto assumes its rearmost position relative to the stationary rail 30'.

In this condition, the electric motor 11 is deenergized and the seat is substantially locked at the rearmost position. That is, under this condition, there is no relative movement between the pinion 47' supported by the movable rail 40' and the teeth 38' supported by the stationary rail 30'. Even when a marked force is applied to the movable rail 40' through the seat by a seat occupant, the meshed engagement between the worm 49' and the worm wheel 48' prevents rotation of the worm wheel 48' and thus prevents the movement of the movable rail 40' relative to the stationary rail 30'.

When the electric motor 11 is energized to rotate the flexible drive cabe 12' in a given direction, the rotation of the cable 12' is transmitted through the gear train to the pinion 47'. Thus, the pinion 47' runs along the rack 38' of the elongate plate 36' while rotating about its axis, so that the movable rail 40' carrying the pinion 47' is moved forward relative to the stationary rail 30'. This means that the seat is moved forward.

When the seat comes to a desired position, the electric motor 11 is deenergized. With this, the seat is locked at a new position.

In the following, advantages of the present invention will be itemized:

Since, in the powered seat slide device 10 of the present invention, the bulky gear mechanism is arranged outside of the rail unit 20' leaving only the rack member (viz., the slitted elongate plate 38') within the rail unit, there is no need for increasing the size of the rail unit. Furthermore, since the parts of the gear mechanism are substantially concealed by the gear housing 45' and the rail unit 20', the external appearance of the seat slide device 10 of the invention is not deteriorated.

When, due to application of a big weight onto the seat, the movable rail 40' is somewhat sagged, the pinion 47' on the vertical shaft 46' in the gear housing 45' is forced to move downward relative to the rack portion 38' of the slitted elongate plate 36'. However, because of the nature of the rack and pinion engagement, this downward movement of the pinion 47' does not induce disengagement between them.

Even when, due to a vehicle collision or the like, a big force is suddenly applied to the seat slide device 10 in a direction to disconnect the movable rail 40' from the stationary rail 30', such disconnection is assuredly prevented by the interlocking engagement between the inward flanges 43' and 43' of the movable rail 40' and the outward flanges 33' and 33' of the stationary rail 30'.

Because the stationary rail 30' is substantially reinforced by the slitted elongate plate 36', the mechanical strength of the stationary rail 30' is increased thereby making the interlocking connection between the stationary and movable rails 30' and 40' much together.

Because of usage of the flexible drive cable 12', the electric motor 11 can be located at any place.

Although the foregoing description is directed to the embodiment wherein the power drive is applied to both the left and right rail units 20 and 20', such drive may be applied to only one unit 20 or 20'.

Furthermore, if desired, the arrangement between the elongate plate 36' and the gear train may be reversed. That is, the elongate plate 36' may be secured to the movable rail 40' and the gear train may be mounted to the stationary rail 30'.

What is claimed is:

1. A powered seat slide device for sliding a seat on a floor to a desired position, comprising:
    two stationary rails extending on and along the floor in parallel with each other, each stationary rail including a bottom wall, parallel side walls raised vertically from respective sides of the bottom wall and opposed flanges extending outwardly from tops of the respective side wall;

two movable rails having the seat mounted thereon, said movable rails slidably and respectively engaged with said stationary rails, each movable rail including inwardly flanged side walls and being slidably engaged with the associated stationary rail in such a manner that the inwardly flanged side walls of the movable rail embrace the opposed flanges of the stationary rail, each movable rail and the associated stationary rail being assembled to define therebetween an elongated tunnel which extends along a common axis of the stationary and movable rails;

an elongated rack plate housed in said elongated tunnel having opposed sides respectively secured to the opposed flanges of one of said stationary rails to extend along the same and form an enclosed cross-section therewith, so that the stationary rail is mechanically strengthened, said rack plate being formed with a longitudinally extending slit at least one side of which is formed with evenly spaced teeth;

a gear mechanism mounted to one of said movable rails to move therewith, said one movable rail being in association with the stationary rail to which said rack plate is connected, said gear mechanism having a pinion which is projected into side elongated tunnel and operatively meshed with said teeth of said rack plate; and an electric motor for actuating said gear mechanism.

2. A powered seat slide device as claimed in claim 1, in which said elongate rack plate is secured to said stationary rail and said gear mechanism is mounted to said movable rail.

3. A powered seat slide device as claimed in claim 2, in which said elongated rack plate is an elongate plate which has a longitudinally extending slit one side of which is formed with teeth which serve as the rack.

4. A powered seat slide device as claimed in claim 3, in which said pinion of the gear mechanism is put in said slit of said elongate plate operatively meshed with said teeth.

5. A powered seat slide device as claimed in claim 2, further comprising a flexible drive cable which connects said electric motor to said gear mechanism for transmitting power of the motor to said gear mechanism.

6. A powered seat slide device as claimed in claim 5, further compressing a gear housing which is securely mounted on said movable rail to house therein essential parts of said gear mechanism.

7. A powered seat slide device as claimed in claim 6, in which said gear mechanism comprises:
a first shaft housed in said gear housing in a manner to be rotatable about its axis, said first shaft mounting thereon said pinion;
a worm wheel mounted on said first shaft thereby to rotate together with said pinion about the axis of the first shaft; and
a worm operatively engaged with said worm wheel and connected to a leading end of said flexible drive cable by said electric motor.

8. A powered seat slide device as claimed in claim 7, in which said gear housing is provided with a hub portion which is projected into said elongated tunnel of the coupled stationary and movable rails to rotatably hold an end of said first shaft.

9. A powered seat slide device as claimed in claim 8, in which said movable rail is formed with an opening through which said first shaft is projected into said elongate tunnel.

10. A powered seat slide device as claimed in claim 9, in which said stationary rail is provided with longitudinally spaced two stoppers which are arranged in said elongated tunnel to restrict the longitudinal movement of said movable rail relative to said stationary rail.

11. A powered seat slide device as claimed in claim 10, in which each stopper is covered with an elastomeric member.

12. A powered seat slide device as claimed in claim 7, in which said worm is mounted on a second shaft the axis of which is perpendicular to that of said first shaft.

13. A powered seat slide device as claimed in claim 5, in which said electric motor is mounted in a recess formed in said seat.

14. A powered seat slide device as claimed in claim 1, further comprising a slider means mounted with the movable rails for receiving the opposed flanges and the opposed sides of the rack plate.

* * * * *